United States Patent
Hohl

(10) Patent No.: US 6,601,545 B1
(45) Date of Patent: Aug. 5, 2003

(54) METHOD AND DEVICE FOR TRANSPORTING HEAT ENERGY THAT IS PRODUCED IN A MOTOR VEHICLE

(75) Inventor: Reiner Hohl, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/869,892

(22) PCT Filed: Oct. 19, 2000

(86) PCT No.: PCT/DE00/03666

§ 371 (c)(1),
(2), (4) Date: Jul. 6, 2001

(87) PCT Pub. No.: WO01/34952

PCT Pub. Date: May 17, 2001

(30) Foreign Application Priority Data

Nov. 11, 1999 (DE) .......................... 199 54 327

(51) Int. Cl.[7] ................................. F01P 3/20
(52) U.S. Cl. .................................... 123/41.31
(58) Field of Search ............... 123/41.31, 41.29, 123/41.05, 142.5 R, 142.5 E

(56) References Cited

U.S. PATENT DOCUMENTS

| | | | |
|---|---|---|---|
| 5,215,044 A | * | 6/1993 | Banzhaf et al. .......... 123/41.05 |
| 5,251,588 A | | 10/1993 | Tsujii et al. |
| 5,531,285 A | | 7/1996 | Green |
| 5,558,055 A | * | 9/1996 | Schatz ................. 123/142.5 R |
| 6,213,233 B1 | * | 4/2001 | Sonntag et al. ....... 123/142.5 R |
| 6,308,664 B1 | * | 10/2001 | Ambros ................... 123/41.12 |

FOREIGN PATENT DOCUMENTS

| | | |
|---|---|---|
| DE | 197 19 792 A | 11/1998 |
| FR | 2 748 428 A | 11/1997 |

* cited by examiner

Primary Examiner—Henry C. Yuen
Assistant Examiner—Hyder Ali
(74) Attorney, Agent, or Firm—Michael J. Striker

(57) ABSTRACT

A method and an apparatus for transporting thermal energy produced in a motor vehicle provides that the waste heat of an electronic component (42), such as a pulse-controlled inverter, be utilized to heat other vehicle parts, such as the internal combustion engine (12) or the passenger compartment. To that end, preferably two coolant circuits (10, 40) are provided, which can be coupled to one another or decoupled from another in order to control the flow of heat.

15 Claims, 2 Drawing Sheets

Figure 1:
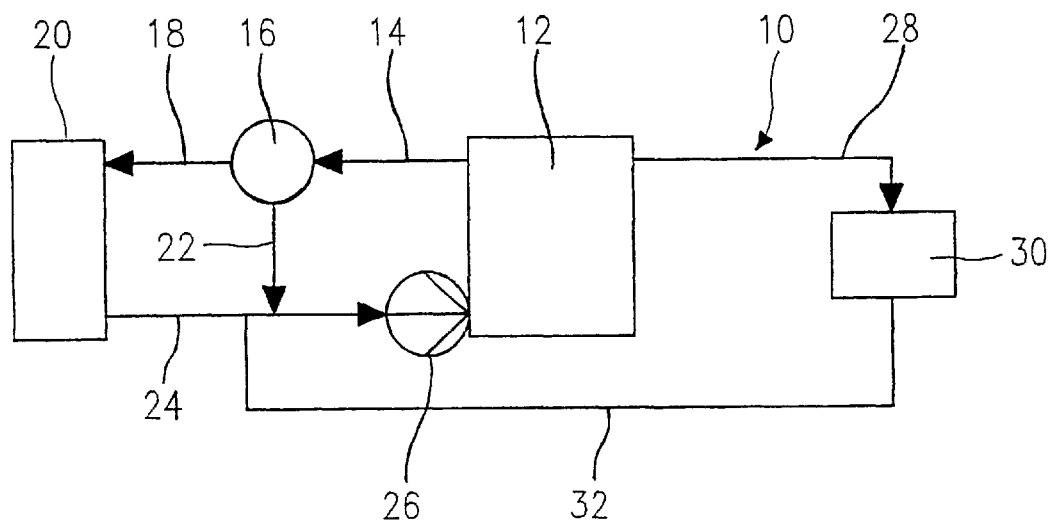

METHOD AND DEVICE FOR TRANSPORTING HEAT ENERGY THAT IS PRODUCED IN A MOTOR VEHICLE

PRIOR ART

The invention relates to a method and an apparatus for transporting thermal energy produced in a motor vehicle.

Until now, the energy produced in vehicle parts in their operation mostly goes unused and is emitted without being controlled to the environment. Only in the case of the internal combustion engine is the thermal energy contained in its coolant circuit utilized to heat the passenger compartment, via a heating-type heat exchanger.

The object of the invention is to create a method and an apparatus by means of which the thermal energy produced in operation of the motor vehicle is utilized in such a way as to reduce the energy consumption of the motor vehicle.

ADVANTAGES OF THE INVENTION

This is attained by a method that is characterized by the follow steps:
  an electronic component in the motor vehicle is cooled, and
  the thermal energy dissipated upon cooling of the component is conducted onward to some other vehicle part to heat it.

The invention is furthermore attained by an apparatus which serves in particular to perform the method of the invention. The apparatus has an electronic component, which is coupled with a heat-dissipating line, and the line in turn is coupled to another vehicle part in such a way that thermal energy from the component is output to the vehicle part via the line.

In particular, the invention is employed to dissipate the thermal energy from so-called power electronics, that is, electronics characterized by high electrical consumption.

The invention is based on the recognition that the waste heat produced in the operation of electronic components has until now been completely unutilized in the motor vehicle and simply output to the ambient air. The power and number of electronic components and thus the quantity of heat to be dissipated from electronic components is increasing from one motor vehicle generation to the next. Furthermore, however, parts in the motor vehicle, and here the term "parts" is not meant to be limited to a single part but instead to cover entire structural groups, are provided that require heat for their desired operation. While in the case of electronic components on the one hand, such applications as large-area cooling fins are provided for dissipating thermal energy to the ambient air, on the other, additional measures are taken to heat other vehicle parts. For instance, because of the increasing efficiency of internal combustion engines, to achieve a high level of heating comfort in diesel vehicles, it has meanwhile become necessary to provide supplementary electric heaters to heat the passenger compartment, but as a result both electrical and fuel consumption rise. Because of the higher demand for electrical energy in a motor vehicle, for instance, in future a 42-volt starter generator will be employed, whose power electronics, such as the pulse-controlled inverter, might have a heat loss of more than one kilowatt. By means of the invention, this energy could for instance be carried into the coolant circuit of the engine or directly into a heating-type heat exchanger for heating the passenger compartment.

Advantageous features of the invention will become apparent from the dependent claims.

Preferably, the dissipated thermal energy from the electronic component is conducted onward in controlled fashion to the vehicle part to be heated; that is, the quantity of heat supplied to the vehicle part is controlled, for instance in order to prevent the vehicle part from becoming overheated or to adjust it to its optimal temperature.

In a preferred embodiment, the coolant circuit of the component is assigned its own radiator. As a function of a predetermined allowable or desired maximum temperature of the component and/or a predetermined limit temperature of the vehicle part to be heated, the coolant circuit of the component is coupled to that of the vehicle part and/or to its own radiator. Situations are conceivable in which the dissipation of the thermal energy from the electronic component to the structural part to be heated is not sufficient to cool the component adequately. Then its own radiator must be turned on, by way of which thermal energy is output for instance to the environment. Furthermore, the vehicle part to be heated can also have an optimal temperature range that should not be exceeded or undershot, if performance is to be maintained. For instance, once an internal combustion engine has reached its optimal operating temperature, it should not be cooled down. However, if the temperature of a coolant, supplied from the coolant circuit of the component into the coolant circuit of the engine, were below the desired temperature in the coolant circuit of the engine, then coupling the two coolant circuits to one another would lead to an undesired additional cooling of the engine. Conversely, however, the radiator of the coolant circuit assigned to the component should be turned off if the engine has not yet reached its operating temperature. Specifically, then as much heat as possible should be supplied from the component to the coolant circuit of the engine, so that the latter will reach its optimal operating temperature as fast as possible.

To attain the aforementioned goals, it is also advantageous that the coolant circuits of the component and of the engine are decoupled from one another, and that preferably in addition the coolant circuit of the component supplies thermal energy to its own radiator, whenever the exit temperature of the coolant from the coolant circuit of the component is below a predetermined operating temperature of the engine, which the engine has just reached at that moment.

Furthermore, in one feature, the invention provides that the volumetric flow of coolant in at least one of the two coolant circuits be controlled as needed via at least one electric coolant pump integrated with the coolant circuit. Until now, mechanical pumps that are coupled with the engine have been used as coolant pumps. For optimal adaptation of the heat transport in a coolant circuit, however, an electric coolant pump is now preferably used, by which the heat transport is possible with precision and as needed inside the coolant circuit or between circuits that are coupled with one another.

In one feature, the volumetric flow in the coolant circuit of the engine is controlled as a function of the engine temperature and the load range of the engine in which the engine is at that moment.

The method of the invention is also employed when the engine is turned off, for instance in order to utilize the energy of the still-warm component to heat the passenger compartment.

The method of the invention is attractive particularly for hybrid engines, in which the internal combustion engine is frequently off, and in the meantime electric motors or other electronic components are in operation and produce heat.

The apparatus of the invention, in one feature, provides that the heat-dissipating line is part of a coolant circuit assigned to the component, which coolant circuit communicates with the coolant circuit of the engine. The coolant circuit of the component can furthermore also communicate directly with the heating-type heat exchanger, however, or can have its own heating-type heat exchanger. In these versions, using the heat of the component to heat the passenger compartment is a primary goal.

The coolant circuits of the component and of the engine can preferably be coupled to one another and decoupled again from one another, to achieve control of the heat transport.

To avoid the energy loss in heat exchangers, the coolant circuits of the component and of the engine preferably communicate in such a way that coolant from one coolant circuit can flow into that of the other; that is, fluidically, the coolant circuits partly merge with one another.

DRAWINGS

Figure 2:
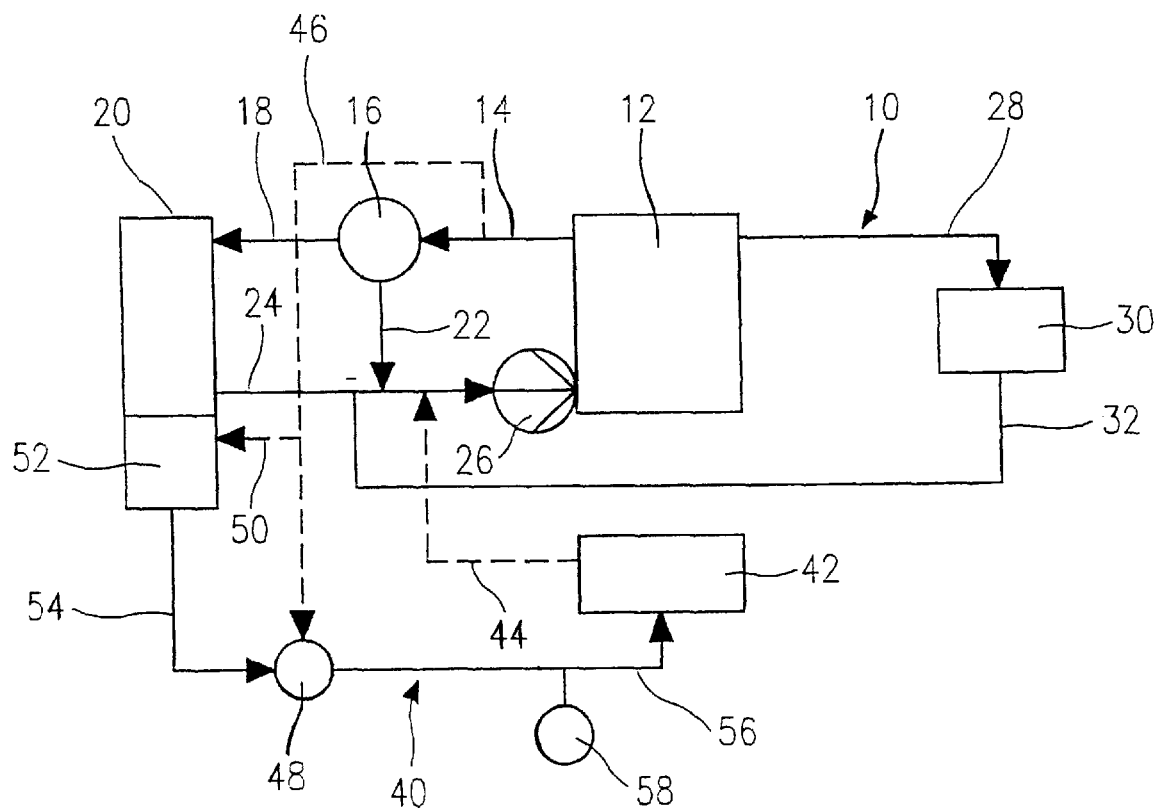
Figure 3:
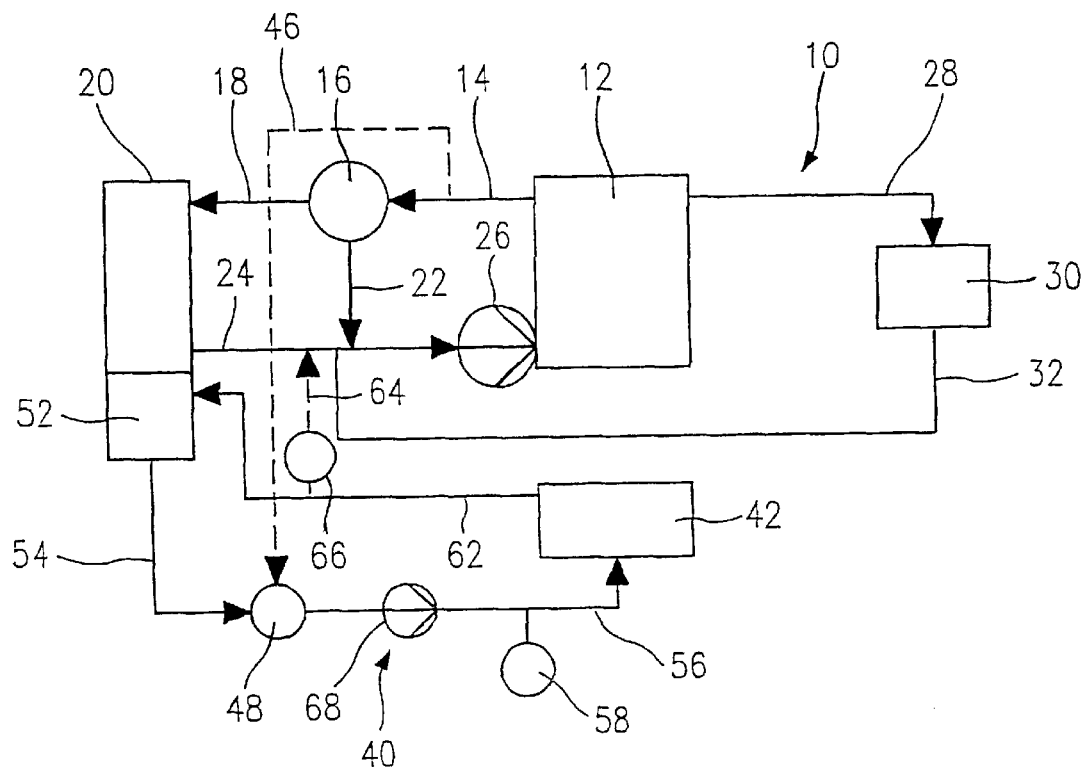
Figure 4:
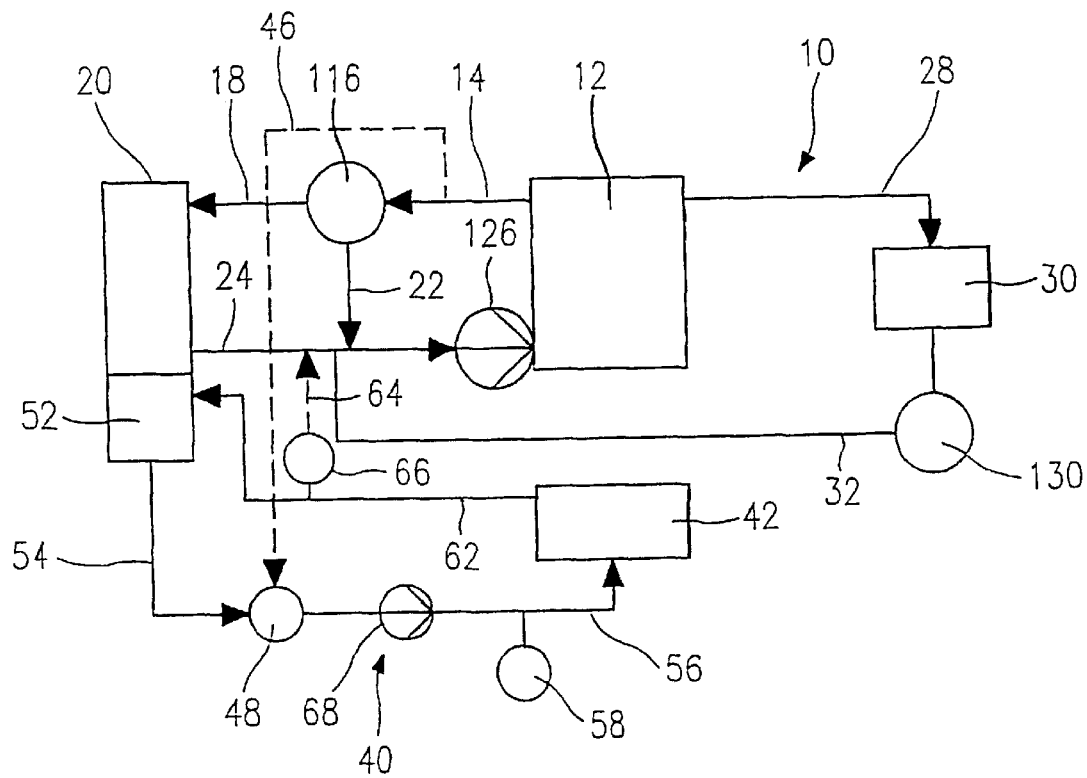

Further characteristics and advantages of the invention will become apparent from the ensuing description and in conjunction with the ensuing drawings. Shown in the drawings are:

FIG. 1, a block circuit diagram of a coolant circuit of an internal combustion engine of the prior art;

FIG. 2, a block circuit diagram of a first embodiment of the apparatus of the invention for performing the method of the invention;

FIG. 3, a block circuit diagram of a second embodiment of the apparatus of the invention for performing the method of the invention; and FIG. 4, a block circuit diagram of a third embodiment of the apparatus of the invention for performing the method of the invention.

DESCRIPTION OF THE EXEMPLARY EMBODIMENTS

FIG. 1 shows a known coolant circuit 10 of an internal combustion engine 12 of a motor vehicle. From the engine 12, a line 14 leads from the coolant circuit 10 to a thermostat valve 16. From the thermostat valve 16, a line 18 branches off to a radiator 20, and a line 22 branches off to a connecting line 24 between a radiator 20 and a mechanical coolant pump 26 coupled to the engine 12. The coolant pump 26 in turn communicates fluidically with the engine 12. From the engine 12, a line 28 branches off to a heating-type heat exchanger 30, which is used to heat the passenger compartment. On the outlet side, a line 32 connects the heating-type heat exchanger 30 to the connecting line 24.

At coolant temperatures below approximately 90° C., the thermostat valve 16 allows only one flow line of the coolant, arriving via the line 14, via the line 22 to the connecting line 24. If the coolant temperature exceeds 90° C., however, the thermostat valve 26 opens the circuit toward the radiator 20 and at the same time closes the line 22.

As FIG. 2 shows, the coolant circuit 40 of an electronic component 42, for instance in the form of a pulse-controlled inverter for a 42-volt starter generator (not shown), is also integrated into the conventional coolant circuit, shown in FIG. 1, of the engine 12. All the parts already described in conjunction with FIG. 1 are identified with the same reference numerals in FIGS. 2–4 as well, where they are identical to or have the same function or are used in the same way in other embodiments. The coolant circuit 40 of the electronic component 42 can be coupled to and decoupled from the coolant circuit 10 of the engine. The coolant circuit 40 of the component 42 includes a plurality of lines, which will now be explained.

One line 44 fluidically connects the component 42 to the connecting line 24 in the coolant circuit 10, so that the coolant in the line 44 flows into the coolant circuit 10. The part of the connecting line 24 downstream of the discharge point into the line 44, the mechanical coolant pump 26, the engine 12 (or more precisely, the lines carrying coolant that are provided in the engine block) and an upstream part of the line 14 are each at the same time a component part of the coolant circuit 40. Finally, a line 46 branches off from the line 14 and leads to a 3-way valve 48. From the line 46, a line 50 also branches off to a radiator 52 assigned to the coolant circuit 40. On the outlet side, the radiator 52 communicates with the 3-way valve 48 via a line 54. The 3-way valve 48 communicates in turn on the outlet side to the component 42 via the line 56, as a result of which the coolant circuit 40 is closed. A temperature sensor 58, which ascertains the temperature of the coolant at this point, is seated in the line 56.

The apparatus shown in FIG. 2 and formed of two coolant circuits 10, 40 that can be coupled together serve to transport thermal energy produced in a motor vehicle. For example, the apparatus is part of a hybrid motor vehicle, which has an electrical drive system and an internal combustion engine. When the vehicle is started, for instance on startup with an electrical drive system, the power electronics represented by the component 42 heat up so severely that they can have a heat loss of more than 1 kW. This thermal energy is used to heat other vehicle parts, which in the present case are not merely a single part but rather an entire structural group in the form of the coolant circuit 10, as will be explained below.

The waste heat from the component 42 is fed via coolant and the line 44 into the coolant circuit 10, where immediately after starting of the motor vehicle it is used to heat the engine 12 quickly. On the engine output side, a partial volumetric flow of the coolant located in the line 14 is branched off and reaches the line 46. The temperature sensor 58 ascertains the temperature immediately upstream the component 42. If the coolant is cold enough, the valve 46 switches an appropriate opening, so that the line 46 communicates directly with the line 56, and the branched-off coolant flows directly to the component 42. In this way, all the waste heat from the component 42 is fed into the coolant circuit 10.

If the temperature ascertained in the temperature sensor 58 is above a predetermined allowable maximum temperature for the electronic component, the valve 48 is switched differently, so that all or some of the coolant located in the line 46 travels via the line 50 to reach the radiator 52, where it is cooled, and finally flows via the lines 54 and 56 to the component 42.

A disadvantage of this version can occur whenever the temperature of the coolant immediately downstream of the component 42 is below a predetermined limit temperature for the entry of the coolant into the coolant circuit 10. This would in fact cause undesired cooling of the engine 12, if the engine has already reached its desired operating temperature.

One advantage of the embodiment shown in FIG. 2, however, is that the quantity of thermal energy that is fed into the coolant circuit 10 can be controlled as needed by the valve 48.

Still more-precise control, more suitable to the demand, can be attained by means of the embodiment of the apparatus shown in FIG. 3.

The apparatus shown in FIG. 3 makes it possible to decouple the coolant circuits 10 and 40 completely from one another. To that end, instead of the line 44, a line 62 is extended from the component 42 directly to the radiator 52. From the line 62, a line 64 branches off to the connecting line 24, and a valve 66 is seated in the line 64. As a further distinction from the embodiment of FIG. 2, there is no provision for direct communication of the line 46 with the radiator 52. Furthermore, an electric coolant pump 68, which can precisely control the volumetric flow of coolant in the coolant circuit 40, is disposed in the line 56. The valves 48, 66 form a device for coupling and decoupling the coolant circuits 10, 40.

The apparatus shown in FIG. 3 operates by the following method: As long as the coolant is at a low temperature, measured by the temperature sensor 58, it flows out of the coolant circuit 10 via the line 46 directly into the line 56, via the suitably switched valve 48. The valve 66 is likewise open, so that some of the arriving flow reaches the coolant circuit 10, and some reaches the radiator 52. However, if the temperature of the coolant rises to excessively high values, then the valve 48 is switched in such a way as to prevent the inflow of fluid via the line 46. Instead, the lines 54 and 56 are made to communicate with one another. The valve 66 is closed, so that the coolant circuit 40 is completely decoupled from the coolant circuit 10, and the coolant can flow via the line 62 directly into the radiator 52 and from there via the line 54 and the line 56 to the component 42, which it cools. The coolant flow for cooling the component 42 is now recirculated solely via the electronic coolant pump 68. The coolant pump 68 can also be turned on when both coolant circuits 10, 40 are coupled to one another, because in this way the volumetric flow of coolant that cools the component 42 can be supplied as needed and precisely metered to the coolant circuit 10, and the volumetric flow is no longer dependent on the engine rpm. With the aid of the coolant pump 68, the component 42 can also be cooled when the engine 12 is off.

In the embodiment of the apparatus shown in FIG. 4, the quantity of heat supplied to the coolant circuit 10 and the transport of heat within both coolant circuits 10, 40 can be controlled even more exactly. The layout of this apparatus is largely identical to that shown in FIG. 3. However, instead of a mechanical coolant pump 26, an electric coolant pump 126 is provided, which controls the volumetric flow 10 inside the coolant circuit 10 exactly. Instead of the thermostat valve 14, a valve 116 that can be triggered from outside is provided. A thermostat valve leads to a very high pressure loss, so that the electric coolant pumps would have to have high performance. Other designs of 3-way valves are distinguished by a very low pressure loss, so that the pressure losses in the coolant circuit 10 can be reduced. Furthermore, a valve 130 is preferably also disposed downstream of the heating-type heat exchanger 30.

To reduce fuel consumption in the partial-load range of the engine 12, the maximum allowable limit temperature in the coolant circuit 10 is higher than in the conventional coolant circuits previously used. To enable exact control of the temperatures in the entire apparatus and to supply thermal energy to those points of the apparatus that require the energy just at that time, the valves 116 and 130 and the electric coolant pump 126 are all provided. For instance, if no heat is dissipated in the heating-type heat exchanger 30, then the valve 130 can prevent a flow of coolant through the lines 28 and 32, so that the coolant circuit 10 is reduced in size. As needed, the quantity of coolant supplied to the engine can then be controlled, so that the engine can either be heated up fast or cooled fast.

Increasing the maximum allowable coolant temperature in the partial-load range of the engine 12 makes it possible to reduce fuel consumption. In partial-load operation, in the embodiment of FIG. 4, a coolant temperature of about 110° C., for instance, is allowed, which reduces the viscosity of the engine lubricant, as a result of which in turn consumption can be additionally reduced. Still higher temperatures are not sought, however, because otherwise the lubricant film could tear. The elevated allowable temperatures in the coolant circuit 10 can, however, lead to a thermal overload on the component 42, and therefore the coolant circuit 40 can optionally be decoupled from the coolant circuit 10 by way of suitable triggering of the valves 48 and 66.

An appropriate elevation of the temperature in the coolant circuit 10 in partial-load operation is possible in the embodiment shown in FIG. 3 as well.

Instead of the embodiments shown, it is also possible to assign the coolant circuit 40 its own heating-type heat exchanger, so that while then the engine 12 can no longer be heated, in return the passenger compartment is heated without heat losses.

Coupling the two coolant circuits 10, 40 inside one common radiator, which then acts as a heat exchanger, is furthermore conceivable.

The invention is not limited to utilizing the energy that is generated in a pulse-controlled inverter for a starter generator. This is merely one preferred exemplary embodiment. Another example for the so-called power electronics whose energy is utilized is an electric motor of a hybrid vehicle, which has a plurality of electric motors to drive it. One electric motor then serves to start the vehicle or run it up to speed, for instance, and is only briefly, but then very severely, under load. Then, the heat generated in the briefest time in the electric motor can be utilized as well.

List of Reference Numerals

10: Coolant circuit of the internal combustion engine
12: Internal combustion engine
14: Line
16: Thermostat valve
18: Line
20: Radiator
22: Line
24: Connecting line
26: Mechanical coolant pump
28: Line
30: Heating heat exchanger
32: Line
40: Coolant circuit of the component
42: Electronic component
44: Line
46: Line
48: 3-way valve
50: Line
52: Radiator
54: Line
56: Line
58: Temperature sensor
62: Line
64: Line
66: Valve
68: Electric coolant pump
116: Triggerable valve
126: Electric coolant pump
130: Valve

What is claimed is:
1. A method for transporting thermal energy produced in a motor vehicle having an engine (12) with a coolant circuit (10), characterized by the following steps:
- cooling of an electronic component (42) in the motor vehicle, and
- conducting the thermal energy, dissipated upon cooling of the component (42), onward to another vehicle part to heat it,
- controlling volumetric flow in the coolant circuit (10) of the engine (12) as a function of the engine temperature and the load range of the engine (12) in which the engine is at that moment,
- at least one coolant circuit (40) for the electronic component (42) is provided by way of which the heat is output to a coolant circuit (10) of an internal combustion engine (12) of the vehicle or Is supplied to the passenger compartment,
- the electronic component (42) Is assigned a coolant circuit (40) with its own radiator (52),
- as a function of a predetermined allowable maximum temperature of the component (42) and a predetermined limit temperature of the vehicle part to be heated, the coolant circuit (40) of the component (42) is coupled to the coolant circuit (10) of the vehicle part and/or to its own radiator (52),
- and the radiator (52) of the electronic component (42) is cooling the electronic component in case of insufficient heat transfer to the vehicle part.

2. The method of claim 1, characterized in that the energy quantity supplied to the vehicle part to be heated is controlled.

3. The method of claim 1, characterized in that as a function of the temperature of the vehicle part to be heated and of the electronic component (42), the supply of heat to the vehicle part to be heated is interrupted.

4. The method of claim 1, characterized in that the coolant circuits (40, 10) of the component (42) and of the engine (12) are decoupled from one another whenever the coolant circuit (40) of the component (42) would lead to cooling of the engine (12).

5. The method of claim 4, characterized in that the coolant circuit (40) of the component (42) feeds thermal energy to its own radiator (52) whenever the coolant circuit (40) of the component (42) would lead to cooling of the engine (12).

6. The method of claim 1, characterized in that the volumetric flow of coolant in at least one of the two coolant circuits (10, 40) is controlled as needed via at least one electric coolant pump (68; 126) integrated with the coolant circuit (10, 40).

7. The method of claim 1, characterized in that it is employed with the engine (12) turned off.

8. An apparatus for transporting thermal energy produced in a motor vehicle, in particular for performing the method of one of the foregoing claims,
characterized in that
an electronic component (42) is coupled to a heat-dissipating line (44; 62, 64), and the line (44; 62, 64) is re-coupled to another vehicle part in such a way that thermal energy from the component (42) is output to the vehicle part via the line (44; 62, 64); and
the line (44; 62, 64) is part of a coolant circuit (40) assigned to the component (42), which coolant circuit communicates with the coolant circuit (10) of an internal combustion engine (12) or a heating-type heat exchanger (30).

9. The apparatus of claim 8, characterized in that the coolant circuits (10, 40) can be coupled to one another and decoupled from another by means of a device.

10. The apparatus of claim 8, characterized in that the coolant circuits (10, 40) communicate with one another in such a way that coolant from one coolant circuit (10, 40) can flow into the other coolant circuit (10, 40).

11. The apparatus of claim 8, characterized in that each coolant circuit (10, 40) is assigned its own radiator (20, 52) that can be turned on selectively.

12. The apparatus of claim 8, characterized in that at least one electric coolant pump (68, 126) is provided in at least one coolant circuit (40, 10).

13. The apparatus of claim 8, characterized in that a heating-type heat exchanger (30) for heating the passenger compartment is provided in at least one of the coolant circuits (10, 40).

14. An apparatus for transporting thermal energy produced in a motor vehicle, in particular for performing the method of one of the foregoing claims,
characterized in that
an electronic component (42) is coupled to a heat-dissipating line (44; 62, 64), and the line (44; 62, 64) is re-coupled to another vehicle part in such a way that thermal energy from the component (42) is output to the vehicle part via the line (44; 62, 64); and
the electronic component (42) is a pulse-controlled inverter for a starter generator.

15. A method for transporting thermal energy produced in a motor vehicle having an engine (12) with a coolant circuit (10),
characterized by the following steps:
- cooling of an electronic component (42) in the motor vehicle, and
- conducting the thermal energy, dissipated upon cooling of the component (42), onward to another vehicle part to heat it,
- providing at least one coolant circuit (40) for the electronic component (42), by way of which the heat is output to a coolant circuit (10) of an internal combustion engine (12) of the vehicle or is supplied to the passenger compartment,
- controlling the volumetric flow of coolant in at least one of the two coolant circuits (10, 40) as needed via at least one electric coolant pump (68; 126) integrated with the coolant circuit (10, 40),
- controlling volumetric flow in the coolant circuit (10) of the engine (12) as a function of the engine temperature and the load range of the engine (12) in which the engine is at that moment, and
- controlling the volumetric flow of both said coolant circuits (10, 40) by associated electronic coolant pumps.

* * * * *